United States Patent
Strong

(10) Patent No.: US 9,641,358 B2
(45) Date of Patent: May 2, 2017

(54) ADAPTIVE MODULATION

(71) Applicant: Cambium Networks Ltd, Ashburton, Devon (GB)

(72) Inventor: Peter Strong, Newton Abbot (GB)

(73) Assignee: Cambium Networks Ltd, Ashburton, Devon (GB)

(*) Notice: Subject to any disclaimer, the term of this patent is extended or adjusted under 35 U.S.C. 154(b) by 0 days.

(21) Appl. No.: 14/943,776

(22) Filed: Nov. 17, 2015

(65) Prior Publication Data

US 2016/0072648 A1    Mar. 10, 2016

Related U.S. Application Data

(63) Continuation of application No. PCT/GB2014/051513, filed on May 16, 2014.

(30) Foreign Application Priority Data

May 17, 2013 (GB) .................................. 1308897.6

(51) Int. Cl.
*H04L 25/08* (2006.01)
*H04L 25/03* (2006.01)
*H04L 1/00* (2006.01)

(52) U.S. Cl.
CPC ...... *H04L 25/03006* (2013.01); *H04L 1/0003* (2013.01); *H04L 1/0015* (2013.01);
(Continued)

(58) Field of Classification Search
CPC ....... H04L 1/0009; H04L 1/0025; H04L 1/06; H04L 1/0618; H04L 25/03885;
(Continued)

(56) References Cited

U.S. PATENT DOCUMENTS 4,736,388 A * 4/1988 Eguchi .................. H04L 1/0003
375/222
5,991,109 A * 11/1999 Taniguchi .......... G11B 5/00865
360/51
(Continued)

FOREIGN PATENT DOCUMENTS

EP    1398927 A1    3/2004

OTHER PUBLICATIONS

International Search Report and Written Opinion from corresponding PCT application, PCT/GB2014/051513, dated Aug. 19, 2014, 10 pgs.

*Primary Examiner* — Emmanuel Bayard
(74) *Attorney, Agent, or Firm* — Brinks Gilson & Lione

(57) ABSTRACT

A wireless communication system includes first and second transceivers operable to transmit and receive signals over a communication channel using a plurality of modulation modes. A first signal is received which has been transmitted using a first modulation mode over the communication channel from the first transceiver to the second transceiver, and a first channel equalization characteristic for an equalizer of a first type for receiving the first signal at the second transceiver is determined from measurements of the communication channel. From the first channel equalization characteristic, a second channel equalization characteristic is determined for an equalizer of a second type for a second modulation mode. A measure of a difference between the second and the first channel equalization characteristics is determined, and the second modulation mode is selected for transmission over the communication channel from the first transceiver at least in part in dependence on the measure.

14 Claims, 7 Drawing Sheets

(52) U.S. Cl.
CPC .. *H04L 25/03012* (2013.01); *H04L 25/03159* (2013.01); *H04L 2025/03541* (2013.01)

(58) Field of Classification Search
CPC .............. H04L 27/01; H04L 27/2646; H04L 25/03949; H04L 25/08; H04L 1/0003; H04L 27/361; H04L 1/0015
USPC ............ 375/260, 267, 299, 347, 349, 285
See application file for complete search history.

(56) References Cited

U.S. PATENT DOCUMENTS

| | | | | |
|---|---|---|---|---|
| 6,298,092 | B1* | 10/2001 | Heath, Jr. | H01Q 1/246 375/267 |
| 6,304,599 | B1* | 10/2001 | Igarashi | H04B 3/145 375/229 |
| 6,351,499 | B1* | 2/2002 | Paulraj | H01Q 1/246 375/267 |
| 6,587,407 | B1* | 7/2003 | Nakamura | G11B 20/10009 369/124.11 |
| 6,754,475 | B1* | 6/2004 | Harrison | H04B 7/0615 455/115.1 |
| 6,760,882 | B1* | 7/2004 | Gesbert | H04L 1/0016 370/252 |
| 6,836,457 | B2* | 12/2004 | Nakamura | G11B 20/10009 360/65 |
| 6,922,445 | B1* | 7/2005 | Sampath | H01Q 1/246 375/267 |
| 7,016,297 | B2* | 3/2006 | Tang | H04L 1/0003 370/204 |
| 7,103,325 | B1* | 9/2006 | Jia | H04B 7/0619 370/329 |
| 7,315,814 | B2* | 1/2008 | Vainio | G10L 19/18 704/221 |
| 7,526,035 | B2* | 4/2009 | Suh | H04L 1/0001 375/132 |
| 7,593,486 | B2* | 9/2009 | Jeong | H04B 7/0689 375/260 |
| 7,616,684 | B2* | 11/2009 | Cohen | H04L 25/03057 333/28 R |
| 7,697,412 | B2* | 4/2010 | Anderson | H04L 25/0202 370/208 |
| 7,751,493 | B2* | 7/2010 | Niu | H04B 7/0408 370/335 |
| 7,778,147 | B2* | 8/2010 | Forenza | H04B 7/0689 370/204 |
| 7,961,800 | B2* | 6/2011 | Yoshida | H04L 1/0003 375/260 |
| 8,014,270 | B2* | 9/2011 | Halford | H04L 27/0008 370/203 |
| 8,068,539 | B2* | 11/2011 | Molev-Shteiman | H04L 25/03038 375/232 |
| 8,121,019 | B2* | 2/2012 | Tsutsui | H04B 7/0617 370/204 |
| 8,121,185 | B2* | 2/2012 | Cohen | H04L 25/0212 375/232 |
| 8,140,029 | B2* | 3/2012 | Kim | H04B 7/0669 375/267 |
| 8,165,521 | B2* | 4/2012 | Kim | H04B 7/15557 370/293 |
| 8,237,869 | B2* | 8/2012 | Blouin | H04L 1/0047 348/726 |
| 8,265,182 | B2* | 9/2012 | Kishigami | H04L 27/2628 370/210 |
| 8,270,432 | B2* | 9/2012 | Kim | H04B 7/0417 370/465 |
| 8,358,668 | B2* | 1/2013 | Zhang | H04L 1/0025 370/203 |
| 8,428,524 | B2* | 4/2013 | Kim | H04B 7/0669 375/267 |
| 8,451,923 | B2* | 5/2013 | Yano | H04B 7/0417 370/334 |
| 8,462,905 | B2* | 6/2013 | Yamaguchi | H04B 3/145 375/232 |
| 8,515,369 | B2* | 8/2013 | Chae | H04B 7/063 455/101 |
| 8,526,542 | B2* | 9/2013 | Kim | H04L 1/0047 375/267 |
| 8,583,995 | B2* | 11/2013 | Lakkis | H03M 13/1505 714/783 |
| 8,599,945 | B2* | 12/2013 | Sampath | H04B 7/0417 375/260 |
| 8,615,060 | B2* | 12/2013 | Yoshimochi | H04L 25/0212 37/208 |
| 8,681,850 | B2* | 3/2014 | Kawauchi | H04L 25/03057 375/230 |
| 8,712,341 | B2* | 4/2014 | Ko | H04L 1/0027 455/101 |
| 8,750,277 | B2* | 6/2014 | Kim | H04L 27/12 370/208 |
| 8,774,044 | B2* | 7/2014 | Liu | H04L 1/0026 370/252 |
| 8,774,152 | B2* | 7/2014 | Han | H04L 5/0051 370/310 |
| 8,780,839 | B2* | 7/2014 | Taoka | H04B 7/0639 370/252 |
| 8,781,447 | B2* | 7/2014 | O'Mahony | H04N 21/234327 370/235 |
| 8,797,837 | B2* | 8/2014 | Li | H04L 5/0007 370/210 |
| 8,804,886 | B2* | 8/2014 | Wang | H04L 1/005 375/260 |
| 8,856,628 | B2* | 10/2014 | Lakkis | H04B 1/707 375/130 |
| 8,861,499 | B1* | 10/2014 | Narasimhan | H04B 7/0689 370/329 |
| 8,917,208 | B2* | 12/2014 | Niu | H04B 7/0691 342/359 |
| 8,971,210 | B1* | 3/2015 | Murali | H04B 7/0413 370/254 |
| 8,989,249 | B2* | 3/2015 | Zerbe | H04L 1/0026 375/229 |
| 8,989,325 | B2* | 3/2015 | Pustovalov | H04L 25/0236 375/316 |
| 9,020,023 | B2* | 4/2015 | Takaoka | H04L 25/03159 375/229 |
| 9,065,618 | B2* | 6/2015 | Iwai | H04L 5/0007 |
| 9,071,469 | B2* | 6/2015 | Sasahara | H04L 27/2647 |
| 9,083,416 | B2* | 7/2015 | Bolinth | H04B 7/0885 |
| 9,094,238 | B2* | 7/2015 | Zerbe | H04L 1/0026 |
| 9,106,454 | B2* | 8/2015 | Mehrabani | |
| 9,137,063 | B2* | 9/2015 | Zerbe | H04L 1/0026 |
| 9,137,082 | B1* | 9/2015 | Ali | H04L 27/2646 |
| 9,148,322 | B2* | 9/2015 | Zerbe | H04L 1/0026 |
| 9,270,416 | B2* | 2/2016 | Eliaz | H04L 25/03178 |
| 9,300,371 | B1* | 3/2016 | Zhang | H04B 7/0413 |
| 9,306,702 | B2* | 4/2016 | Kwak | H04B 7/0417 |
| 9,337,934 | B1* | 5/2016 | Agazzi | H04B 10/40 |
| 9,344,316 | B2* | 5/2016 | Wu | H04B 7/0417 |
| 2002/0122383 | A1* | 9/2002 | Wu | H04B 7/0417 370/210 |
| 2002/0147953 | A1* | 10/2002 | Catreux | H04L 1/0001 714/746 |
| 2004/0141566 | A1* | 7/2004 | Kim | H04B 7/0417 375/267 |
| 2005/0025040 | A1* | 2/2005 | Tang | H04L 27/2608 370/208 |
| 2005/0220211 | A1* | 10/2005 | Shim | H04L 1/06 375/267 |
| 2008/0316952 | A1* | 12/2008 | Gruber | H04W 72/005 370/312 |
| 2009/0154618 | A1* | 6/2009 | Chang | H04L 27/2601 375/346 |
| 2010/0008440 | A1* | 1/2010 | Lin | H04B 7/0632 375/267 |
| 2011/0069749 | A1* | 3/2011 | Forrester | H04L 25/03038 375/232 |

(56) References Cited

U.S. PATENT DOCUMENTS

| | | | |
|---|---|---|---|
| 2012/0082137 A1* | 4/2012 | Ito | H04L 27/2647 370/331 |
| 2012/0088458 A1* | 4/2012 | Nogami | H04B 7/0632 455/67.11 |
| 2012/0314750 A1 | 12/2012 | Mehrabani | |
| 2013/0070834 A1* | 3/2013 | McKown | H04L 25/03057 375/232 |
| 2013/0114764 A1* | 5/2013 | Zhang | H04L 1/0025 375/340 |
| 2013/0215948 A1* | 8/2013 | Kim | H04B 7/0669 375/224 |
| 2014/0064202 A1* | 3/2014 | Nordstrom | H04W 76/045 370/329 |
| 2014/0286271 A1* | 9/2014 | Kim | H04L 27/12 370/329 |
| 2015/0079917 A1* | 3/2015 | Mujtaba | H04B 7/0817 455/135 |
| 2016/0028460 A1* | 1/2016 | Chen | H04B 7/0417 375/267 |

* cited by examiner

ADAPTIVE MODULATION

CROSS-REFERENCE TO RELATED APPLICATIONS

This application is a continuation of International Application No. PCT/GB2014/051513, filed May 16, 2014, which is published as International Publication No. WO 2014/184580, which is incorporated by reference in its entirety herein, and which claims the benefit of UK Application No. GB 1308897.6, filed May 17, 2013, published as GB Publication No. GB 2514174, which is also incorporated by reference in its entirety herein.

TECHNICAL FIELD

The present invention relates generally to wireless communication systems using adaptive modulation, and more specifically, but not exclusively, to selection of a modulation mode from a plurality of modulation modes including at least one OFDM and one single carrier modulation mode.

BACKGROUND

Modern wireless communications systems are typically placed under potentially conflicting demands for high data capacity and high signal integrity. In order to make the best use of signal propagation conditions in terms of signal to noise ratio and signal dispersion, adaptive modulation systems may be deployed, in which a modulation mode is selected for use in a given channel on the basis of signal propagation conditions in that channel. A modulation mode may typically be selected that is expected to give the highest throughput consistent with an acceptable bit error rate.

It is well known that wireless communications systems, such as point-to-point microwave links between terminals, may use single carrier modulation schemes, in which adaptive modulation is used to select a single carrier modulation mode, such as a level of quadrature amplitude modulation (QAM), for example 16 QAM, 32 QAM or 64 QAM, according to received signal quality. Also, it is well known that wireless communications systems may use Orthogonal Frequency Division Multiplexing (OFDM), in which a number of sub-carriers are modulated, typically each subcarrier being modulated with a level of QAM modulation. In OFDM systems, adaptive modulation may be used to select an OFDM modulation mode, such as a level of quadrature amplitude modulation (QAM) on each subcarrier, and/or an arrangement of pilot tones and/or cyclic prefix length, according to received signal quality. Received signal quality may change, even in a system in which the position of the terminals is fixed, due to many factors, such as weather conditions and movement of obstructions, for example. Furthermore, interference levels may change with time.

A measure of received signal quality on a channel, such as signal to noise ratio, may be used to select a modulation mode. Before moving to a different modulation mode, it is advantageous to estimate whether or not the error rate performance in the modulation mode to be selected will be acceptable, and only to select the mode if the error rate performance is expected to be acceptable, as described in U.S. Pat. No. 7,469,013. This estimate may be on the basis of a measure of a vector error taken in the current modulation mode, a vector error being a difference between a received signal vector and an expected modulation state, such as a point on a QAM grid, that the received signal vector is expected to represent. However, it may be the case that it is desired to move from one mode of operation using a first type of equaliser to another mode of operation using a different type of equaliser, for example from an OFDM mode of operation to a single carrier mode of operation. In this case, one mode of operation may not provide a good indicator of the performance of the other mode of operation, for example the vector error of the OFDM mode may not be a good indicator of an error rate performance in the single carrier modulation mode to be selected. Therefore, it may not be possible to ensure that a transition from one mode to another, for example from an OFDM mode to a single carrier mode, will be "hitless", i.e. without causing disruption at the transition and without reversion to the previous mode because the selected mode does not operate at an acceptable error rate.

It is an object of the invention to mitigate the problems of the prior art.

SUMMARY OF THE INVENTION

In accordance with a first aspect of the present invention, there is provided a method of adaptive modulation in a wireless communication system, the wireless communication system including first and second transceivers operable to transmit and receive signals over a communication channel using a plurality of modulation modes, comprising:

receiving a first signal transmitted using a first modulation mode over the communication channel from the first transceiver to the second transceiver;

determining, from measurements of the communication channel, a first channel equalisation characteristic for an equaliser of a first type for receiving the first signal at the second transceiver;

determining, from the first channel equalisation characteristic, a second channel equalisation characteristic for an equaliser of a second type for a second modulation mode;

determining a measure of a difference between the second channel equalisation characteristic and the first channel equalisation characteristic; and selecting the second modulation mode for transmission over the communication channel from the first transceiver, at least in part in dependence on said measure.

Use of the measure allows the selection of the second modulation mode to be at least in part dependent on the difference between the second channel equalisation characteristic and the first channel equalisation characteristic, which may indicate how well the second channel equalisation characteristic may perform in equalising the channel, and therefore whether a error rate performance may be expected to be acceptable. The second channel equalisation characteristic is determined from the first channel equalisation characteristic, and may be determined to be as close as possible to the first characteristic. However, the first and second characteristics are for equalisers of different types, for example for Orthogonal Frequency Division Multiplexing (OFDM) and for single carrier (SC) equalisers, which may have different equalisation capabilities. If, for example, the second channel equalisation characteristic is significantly different from the first channel equalisation characteristic, it may be taken as an indication that the equaliser of the second type is not sufficiently capable of equalising the channel, possibly due to a number of taps in a tapped delay line being insufficient. This may be taken as at least part of a determination that the second modulation mode should not be selected. Conversely, if the second channel equalisation characteristic is similar to the first channel equalisation characteristic, it may be an indication that the equaliser of the second type is at least as capable of equalising the channel as is the equaliser of the first type. This may be taken as at least part of a determination that the selection of the second modulation mode may go ahead.

When said measure comprises data representative of least mean squared error estimates of the difference between the second channel equalisation characteristic and the first channel equalisation characteristic, the measure is based on a reliable estimate of the difference between the second channel equalisation characteristic and the first channel equalisation characteristic.

When said measure is a normalised estimation error, a comparison may be performed reliably.

When the second channel equalisation characteristic is determined on the basis of a least squares error estimation process with respect to the first channel equalisation characteristic, this allows a convenient and reliable method to be provided of setting the second characteristic to be close to that of the first estimate, within the constraints of differences between the first and second types of equaliser.

When the method comprises:

determining a measure of signal quality of the first signal as received at the second transceiver; and selecting the second modulation mode for transmitting at least one second signal is at least in part dependent on the determination of signal quality in combination with said measure, this allows both signal quality and also the relative effectiveness of the first and second equaliser characteristics to be taken into account when deciding whether to select the second modulation mode. This may improve the reliability of the decision.

Said determination of signal quality may comprise an estimate of an error between a received signal vector and an expected modulation state.

This estimate, which may be referred to as vector error, may be conveniently available in a receiver and is typically a good indicator of signal quality.

When said selecting is at least in part in dependence on a sum of an estimate of vector error and said measure, the estimate of vector error comprising an error between a received signal vector and an expected modulation state, this may provide a reliable basis for the selection of the second modulation mode.

When said selecting comprises comparing the sum with a predetermined threshold, this allows the threshold to be determined such that an acceptable error rate may be expected in the second modulation mode, taking into account the effects of the equaliser characteristic and other factors that may affect signal quality such as signal to interference noise and distortion ratio.

When the method comprises:

transmitting the second signal over the selected channel using the second modulation mode; and receiving the second signal at the second transceiver by a process comprising initialising the equaliser of the second type to apply the second channel equalisation characteristic, this allows the second modulation mode to be applied without a delay to allow the equaliser to be trained, as there is no need to adapt second channel equalisation characteristic independently.

The first modulation mode may be an Orthogonal Frequency Division Multiplexing (OFDM) mode and the second modulation mode may be a single carrier mode, which may be a single carrier QAM mode using pilot symbol assisted modulation.

The equaliser of the first type may be an OFDM equaliser, and the first channel equalisation characteristic may be a frequency domain channel estimate.

The equaliser of the second type may be a tapped delay line equaliser, and the second channel equalisation characteristic may be a frequency domain characteristic of the tapped delay line equaliser.

According to a second aspect of the invention there is provided a transceiver for use in a wireless communication system, the wireless communications system including the transceiver and a further transceiver, the transceiver and the further transceiver being operable to transmit and receive signals over a communication channel using a plurality of modulation modes, the transceiver comprising:

a receiver configured to receive, using a first modulation mode, a first signal transmitted over the communication channel from the further transceiver; and a processor configured to:

determine, from measurements of the communication channel, a first channel equalisation characteristic for an equaliser of a first type for receiving the first signal;

determine, from the first channel equalisation characteristic, a second channel equalisation characteristic for use with an equaliser of a second type in receiving a signal transmitted over the communication channel using a second modulation mode;

determine a measure of a difference between the second channel equalisation characteristic and the first channel equalisation characteristic; and select the second modulation mode for transmitting at least one second signal from the further transceiver at least in part in dependence on said measure.

Further features of the invention will be apparent from the following description of preferred embodiments of the invention, which are given by way of example only.

DETAILED DESCRIPTION

By way of example, embodiments of the invention will now be described in the context of a point-to-point broadband wireless communications system operating in unlicensed bands at approximately 5.4 and/or 5.8 GHz. However, it will be understood that this is by way of example only and that other embodiments may involve other wireless systems, and is not restricted to a specific frequency band of operation or a specific standard, and may involve point-to-point and/or point-to-multipoint systems for operation in licensed or unlicensed bands.

Figure 1:
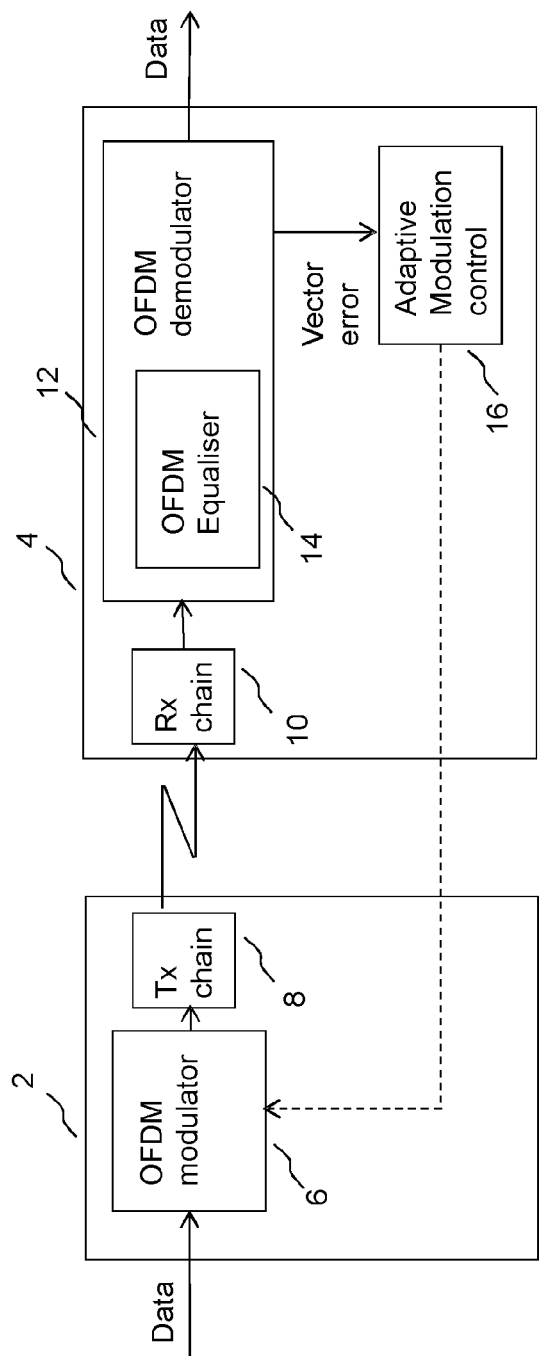
FIG. 1 is a schematic diagram showing an adaptive modulation system operating using OFDM modulation modes according to the prior art.

FIG. 1 shows an example of an adaptive modulation system for operation in a wireless communication system operating according to a number of OFDM modes. A first transceiver 2 transmits an OFDM signal through a radio channel for reception at a second transceiver 4. In FIG. 1, the signal path is shown from the OFDM modulator 6 of the first transceiver, via a transmit (tx) chain 8 and a radio propagation channel, which may be line of sight or non-line of sight, to a receive (rx) chain 10 and OFDM demodulator 12 of the second transceiver. Intermediate components are omitted for clarity, but it will be understood that the transmitter of the first transceiver typically comprises one or more transmit chains, each comprising an upconverter and power amplifier, and one or more antennas, and that the receiver of the second transceiver typically comprises one or more receive antennas, and one or more receive chains, each comprising a low noise amplifier and downconverter. Also, the transceivers are typically be in two-way communication, typically using a Time Division Duplex (TDD) scheme, so that a reverse data channel (not shown) also exists, with a modulator at the second transceiver transmitting via transmit and receive chains to a receiver at the first receiver.

Considering the signal path from the first transceiver to the second transceiver as shown in FIG. 1, data is received at the OFDM modulator 6 of the first transceiver, and this is transmitted to the OFDM demodulator 12 at the second transceiver, and data is demodulated and output from the second transceiver. The OFDM demodulator comprises an OFDM equaliser 14 which compensates the received waveform for the propagation channel characteristic. Typically each data-carrying subcarrier of the OFDM waveform is demodulated in the form of a received signal vector that is compared with expected modulation states. The difference between the received signal vector and an expected modulation state, may be referred to as vector error. A vector error for the OFDM symbol may comprise vector error components from one or more subcarriers.

An adaptive modulation control 16 receives an indication of vector error from the OFDM demodulator, and uses the indication in deciding whether or not to change to a different modulation mode. The adaptive modulation control function 16 controls the modulation mode used by the OFDM modulator 6 via the radio channel between the second and first transceivers.

Figure 2:
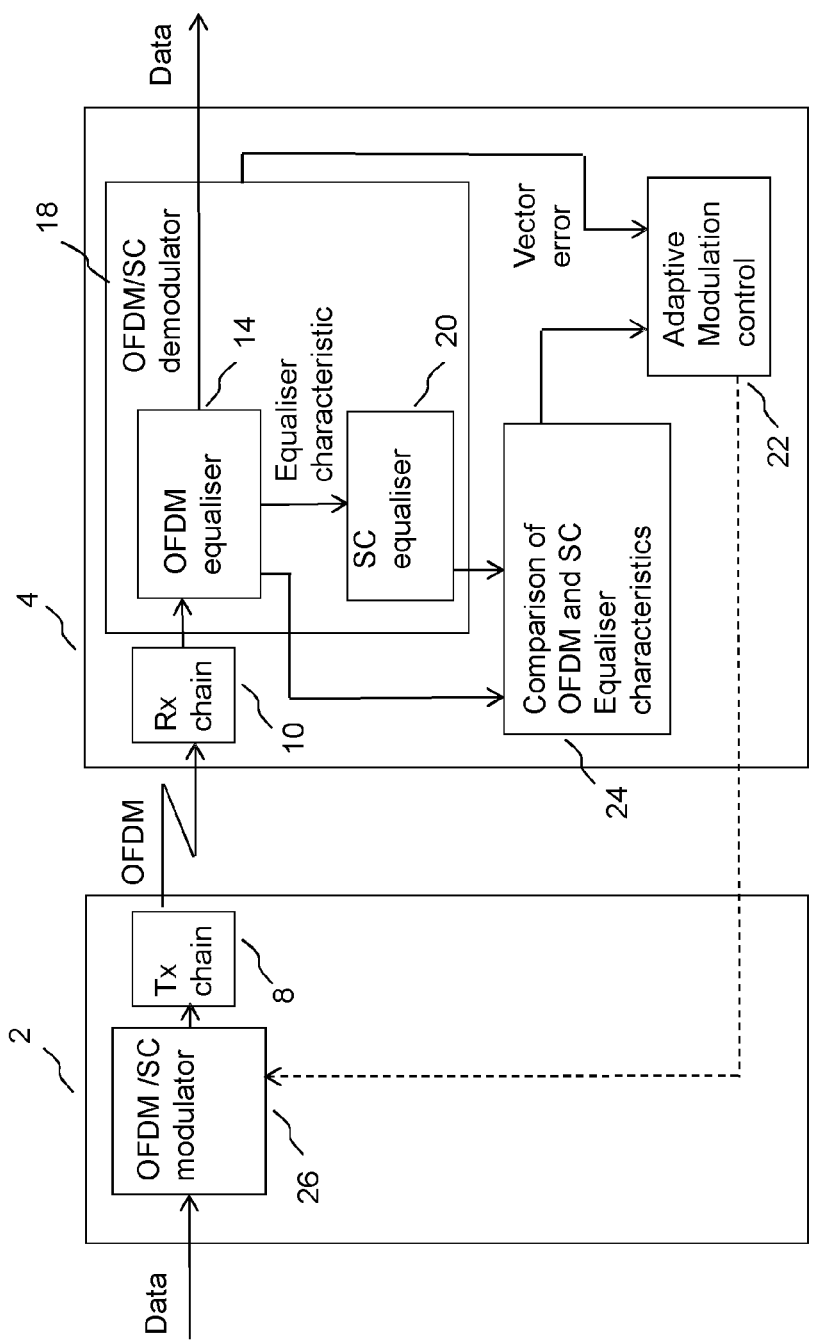
FIG. 2 is a schematic diagram showing an adaptive modulation system according to an embodiment of the invention, illustrating a case in which an OFDM mode is received and an SC mode is evaluated for potential selection.

FIG. 2 shows an adaptive modulation system according to an embodiment of the invention. In the embodiment, signals may be transmitted using modulation modes that include both an OFDM mode and one or more single carrier modes. It is advantageous to include at least one single carrier mode in addition to one or more OFDM modes, because a single carrier mode may potentially be made more spectrally efficient than an OFDM mode, for use in circumstances where channel dispersion due to multipath is low. In these circumstances, a single carrier equaliser may be implemented relatively simply, having limited equalisation characteristics, but potentially sufficient equalisation performance for cases with low channel dispersion. For example a single carrier mode may be a QAM mode, for example 1024 QAM, and may use pilot symbol assisted modulation, which may improve tolerance to phase noise introduced by the transmit and/or receive chains. In this way, higher spectral efficiency may be provided by use of the single carrier mode in cases where the channel is good, i.e. has low dispersion and a high signal to noise ratio, while maintaining more robust OFDM modes for use when dispersion is higher and/or the signal to noise ratio is poorer, for example if the line of sight between the first and second transceivers is obscured.

So, as shown in FIG. 2, at least a first signal is transmitted over a communication channel between a first transceiver 2 and a second transceiver 4 using a first modulation mode, in this example an OFDM modulation mode, the communication channel being a propagation path between the first and second transceiver at a selected frequency. The frequency may be selected as a convenient available frequency channel. The signal using the first modulation mode passes from the OFDM/SC modulator 26, then through a transmit chain 8 to an antenna and then passes through the propagation path between the first and second transceivers to an antenna and receive chain 10 at the second transceiver, to be demodulated at the OFDM/SC demodulator 18 to produce output data. Operation of the system of FIG. 2, for transmission and reception of an OFDM signal, is similar to that described with reference to FIG. 1. The OFDM/SC demodulator 18 comprises an equaliser of a first type, in this example an OFDM equaliser 14. A first channel equalisation characteristic is determined for the OFDM equaliser 14 from measurements of the selected channel. For example, pilot tones transmitted at pre-determined amplitude and phase states within OFDM symbols may be used to estimate the channel frequency characteristic, generating a channel equalisation characteristic for the OFDM equaliser by interpolation using well known techniques, resulting in a frequency domain channel estimate.

However the system of FIG. 2 differs from that of FIG. 1 at least in that a second channel equalisation characteristic is determined from the first channel equalisation characteristic for use with an equaliser of a second type, in this example a single carrier (SC) equaliser 20, in receiving a signal transmitted using a second modulation mode, in this case a single carrier mode. The determination of the second channel equalisation characteristic may be on the basis of a least squares error estimation process with respect to the first channel equalisation characteristic, so that the second characteristic may be set to be as close as possible to that of the first characteristic, within the constraints of differences between the first and second types of equaliser. So, for example, the second channel equalisation characteristic may be determined by successive approximations in order to minimise the least mean squares error between the first and second characteristics. The equaliser of the second type may be a tapped delay line equaliser, and the second channel equalisation characteristic may be a frequency domain characteristic of the tapped delay line equaliser.

The second channel equalisation characteristic may be used to equalise a received single carrier signal, should it be decided to transmit a single carrier signal in a change of modulation mode. In this case, a second signal may be transmitted over the selected channel using the second modulation mode, and the second signal may be received at the second transceiver by initialising the equaliser of the second type to apply the second channel equalisation characteristic. However, in an embodiment of the invention, before a single carrier mode is selected for transmission, a measure of a difference between the second channel equalisation characteristic and the first channel equalisation characteristic is determined. Selection of the second modulation mode for transmitting at least one second signal is made at least in part in dependence on the measure. In other words, the measure of the difference between the second channel equalisation characteristic and the first channel equalisation characteristic may be used, potentially in addition to other factors, in making an adaptive modulation decision. The measure may indicate how well the second channel equalisation characteristic is expected to perform in equalising the channel, and therefore whether the error rate performance may be expected to be acceptable.

For example, if the first and second channel equalisation characteristics are substantially the same, then it may be inferred that both types of equaliser should work as well as each other in compensating for a delay spread in the propagation channel. In that case, it may be decided to go ahead with the selection of the second modulation mode as part of an adaptive modulation process, for example if signal quality measured in the first modulation mode has been found to be sufficient to support the second modulation mode. It may be concluded that there may not be a significant penalty in switching between equaliser types.

However, if the second channel equalisation characteristic is significantly different from the first channel equalisation characteristic, it may be taken as an indication that the equaliser of the second type is not sufficiently capable of equalising the channel, since the attempt to match the two characteristics seems to have been unsuccessful. This may be due, for example, to a delay spread in the propagation channel being in excess of the capabilities of the equaliser of the second type to equalise the channel, possibly due to a number of taps in a tapped delay line being insufficient, or due to a range of delays in the tapped delay line being insufficient. In that case, it may be decided not to go ahead with the selection of the second modulation mode as part of an adaptive modulation process. For example, even if the signal quality measured in the first modulation mode has been found to be sufficient to support the second modulation mode, it may be concluded that there may be a significant penalty in switching between equaliser types, so that selection of the second modulation mode may be inhibited.

The measure of the difference between the second channel equalisation characteristic and the first channel equalisation characteristic may comprise data representative of least mean squared error estimates of the difference between the second channel equalisation characteristic and the first channel equalisation characteristic. This measure may be determined as part of the determination of the second channel equalisation characteristic from this first, since this may also involve a mean squared error estimate, as already mentioned. Typically, the measure may be a normalised estimation error.

As already mentioned, a measure of signal quality measured in the first modulation mode, for example a determination of the quality of the first signal as received at the second transceiver, may be used in combination with the measure of difference between the second channel equalisation characteristic and the first channel equalisation characteristic to determine whether or not the second modulation mode should be selected. The measure of signal quality may be a measure of vector error, that is to say an estimate of an error between a received signal vector and an expected modulation state. The vector error may be determined as part of a demodulation and decoding process, in which it is determined which modulation state, for example a Quadrature Amplitude Modulation (QAM) or Pulse Amplitude Modulation (PAM) state of a carrier or sub-carrier that a received vector is expected to represent. A difference between the received signal vector and the modulation state that it has been determined to represent may be termed a vector error, and may be assumed to be a measure of noise, interference, and/or distortion. The vector error may be an indicator of an expected bit error rate; a greater vector error may be expected to result in more bit errors.

The selection of the second modulation mode as part of the adaptive modulation control may be at least in part in dependence on a sum of an estimate of vector error and the measure of difference between the second channel equalisation characteristic and the first channel equalisation characteristic, for example by comparing the sum with a predetermined threshold. The threshold may be determined such that an acceptable error rate may be expected in the second modulation mode, taking into account the effects of the equaliser characteristic and other factors that may affect signal quality such as signal to interference noise and distortion ratio.

FIG. 2 illustrates that a functional block performing a comparison of OFDM and SC equaliser characteristics 24 may be connected to an adaptive modulation control functional block 22, providing the measure of difference between the second channel equalisation characteristic and the first channel equalisation characteristic to the adaptive modulation control functional block 22. A measure of vector error is also provided to the adaptive modulation control functional block 22, which controls the OFDM/SC modulator 26 of the first transceiver 2 via a radio link from the second transceiver 4 to the first transceiver 2. The comparison functional block adaptive modulation control and the derivation of one equaliser from another may be performed, for example, by a signal processor.

In an alternative embodiment, the adaptive modulation control functional block 22 may control the OFDM/SC modulator 26 via a data link such as a land line that does not include a radio link. This may be the case, for example, for a one-way radio link from a transmitter to a receiver. In embodiments of the invention, the device indicated in FIG. 2 by reference numeral 2 may be referred to as a transmitter and the device indicated in FIG. 2 by reference numeral 4 may be referred to as a receiver.

Figure 3:
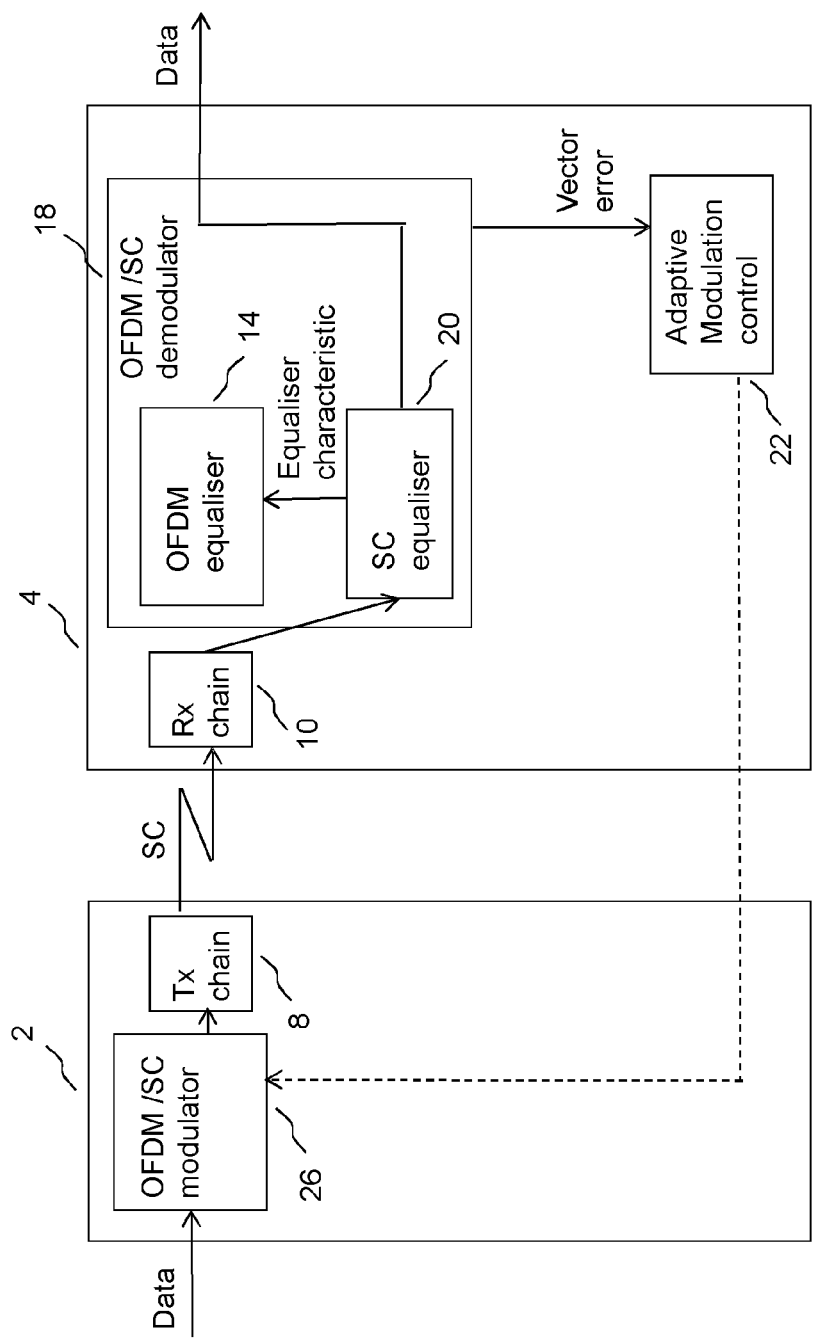
FIG. 3 is a schematic diagram showing an adaptive modulation system according to an embodiment of the invention, illustrating a case in which an SC mode is received and an OFDM mode is evaluated for potential selection.

FIG. 3 illustrates a situation in which a single carrier modulation mode is being received, and an adaptive modulation decision is made as to whether or not to select an OFDM modulation mode. Both FIG. 2 and FIG. 3 represent the same transceivers, but represent different modes of operation. As may be seem from FIG. 3, there may be circumstances in which it may not be necessary to perform the comparison of OFDM and SC equaliser characteristics when considering a move from a SC to an OFDM mode; the OFDM mode may typically be considered to provide equaliser characteristics that are more tolerant of multipath than those provided by the SC equaliser. In this situation, it may be sufficient to monitor the vector error in the SC mode, and to change to an appropriate OFDM mode that would be tolerant of the vector error if the vector error is found to be higher than an acceptable threshold value for SC operation. However, it need not necessarily be the case that the OFDM equaliser is more tolerant of multipath than the SC equaliser, and so there may be embodiments of the invention in which a measure of difference between the second channel equalisation characteristic and the first channel equalisation characteristic may be used in making a decision as whether or not to move from an SC mode to an OFDM mode.

In embodiments of the invention, the first and second modulation modes may be any modes that have a difference between their equalisers. So for example, two OFDM modes having equalisers based on different numbers of pilot tones, or two SC modes having equalisers with different numbers of taps could be employed. For example, an OFDM equaliser of a first type may use a first number of pilot tones and have superior equalisation capabilities to an OFDM equaliser of a second type using fewer pilot tones.

Other measures of receive signal quality may be used instead of, or in addition to, vector error in making an adaptive modulation decision. For example, a measurement of bit error rate may be used in conjunction with the measure of difference between the second channel equalisation characteristic and the first channel equalisation characteristic in making a decision as whether or not to move from the first modulation mode, for example an OFDM mode, to the second modulation mode, for example a SC mode.

Figure 4:
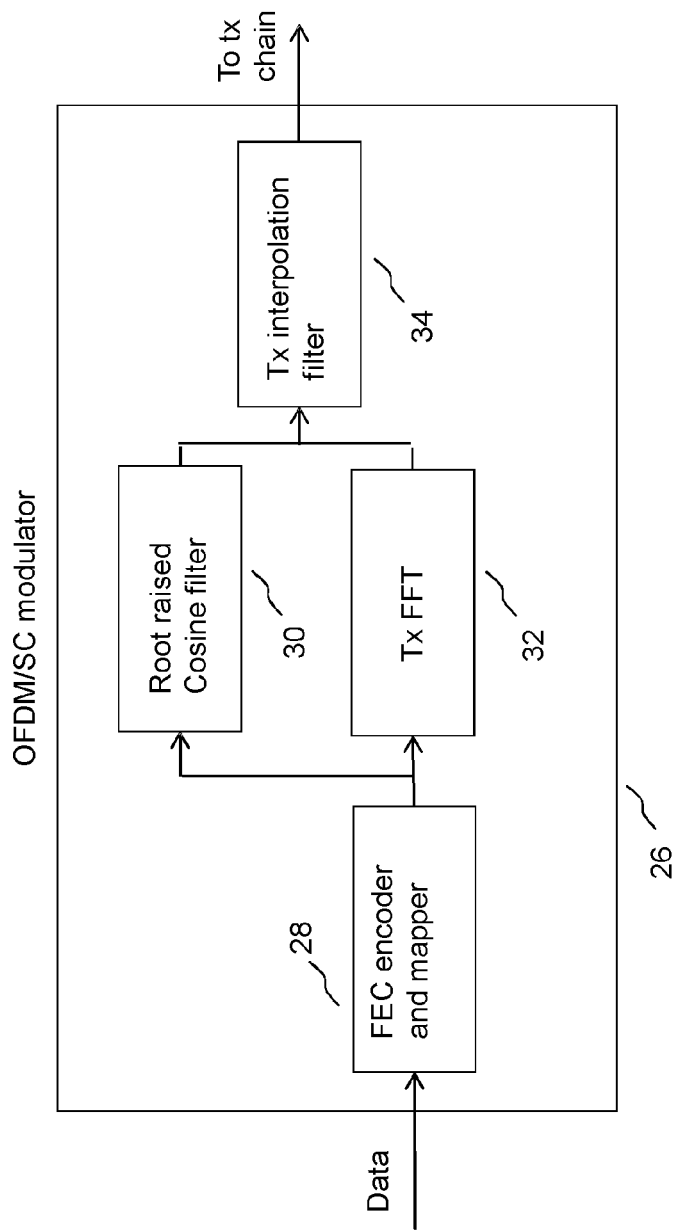
FIG. 4 is a schematic diagram showing part of a physical layer of a transmitter according to an embodiment of the invention.

FIG. 4 shows an example of an implementation of a modulator that may operate in either OFDM or SC modes. Re-use of a common Forward Error Correction (FEC) engine between modes is enabled in this example. In OFDM mode, data, such as payload data for transmission from the first to the second transceiver, is fed from a data framer to the FEC encoder and Mapper 28, and then passes to the transmit Fast Fourier Transform block 32 and then via the transmit interpolation filter 34 to Digital to Analogue Converters (DACs) to a transmit chain. In SC mode, the output of the FEC encoder and Mapper 28 is connected to a Root Raised Cosine filter 30 instead of the transmit FFT block, and the output of the Root Raised Cosine filter 30 is connected via the transmit interpolation filter 34 to Digital to Analogue Converters (DACs) to a transmit chain.

Figure 5:
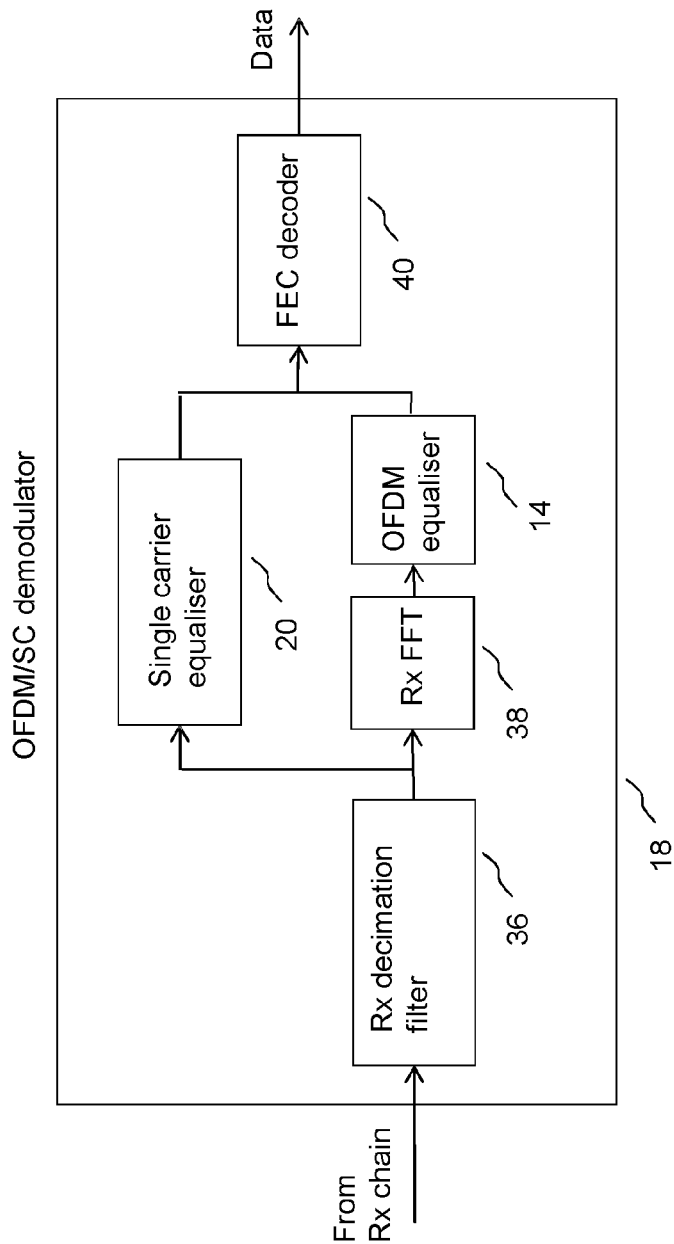
FIG. 5 is a schematic diagram showing part of a physical layer of a receiver according to an embodiment of the invention.

FIG. 5 shows an example of an implementation of a demodulator that may operate in either OFDM or SC modes. Again, re-use of a common Forward Error Correction (FEC) engine between modes is enabled. In OFDM mode, signals from the receive chain are converted to digital form in analogue to digital (A/D) converters, and are passed to a receive decimation filter 36, and then via a receive FFT 38 and OFDM equaliser 14 to a FEC decoder 40. Demodulated data is output to a deframer. In SC mode, the output from the receive decimation filter 36 is passed to the single carrier equaliser 20 instead of to the receive FFT 38, and then to the FEC decoder 40.

Figure 6:
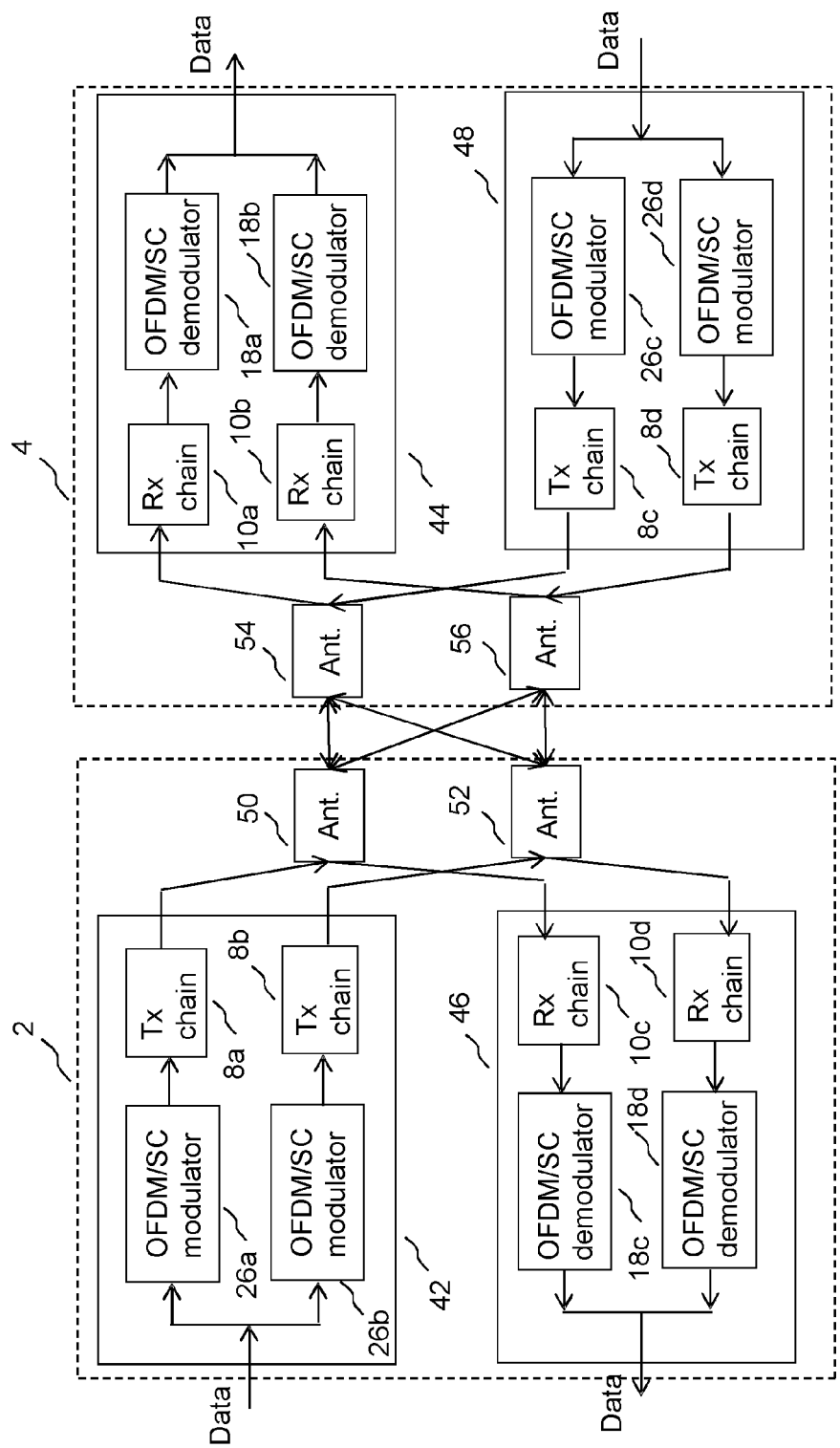
FIG. 6 is a schematic diagram showing an embodiment of the invention in a 2:2 MIMO configuration.

FIG. 6 illustrates that embodiments of the invention may be implemented as a 2×2 Multiple input multiple output (MIMO) point to point radio link between a first transceiver 2 and a second transceiver 4. A bi-directional link is shown, in which the transmitter 42 of the first transceiver 2 transmits via a first antenna 50 and second antenna 52 of the first transceiver to a first antenna 54 and second antenna 56 of the second transceiver, which are connected to the receiver 44 of the second transceiver. Also, the transmitter 48 of the second transceiver 4 transmits via the first antenna 54 and second antenna 56 of the second transceiver to the first antenna 50 and second antenna 52 of the first transceiver, which are connected to the receiver 46 of the first transceiver.

It can be seen that each transmitter is shown with a pair of OFDM/SC modulators 26a, 26b; 26c, 26d, and transmit chains 8a, 8b; 8c, 8d and each receiver is shown with a pair of OFDM/SC modulators 18a, 18b;18c, 18d and receive chains 10a, 10b; 10c, 10d.

In the arrangement of FIG. 6, adaptive modulation may be applied in a similar manner as has been described in connection with FIGS. 2 and 3. A pair of modulators is controlled by the adaptive modulation controller, and the measure of difference between the second channel equalisation characteristic and the first channel equalisation characteristic may be based on a component from each of the pair of OFDM/SC demodulators. A modulation mode may specify a type of space-time coding to be applied in the MIMO scheme in conjunction with other modulations parameters, such as SC/OFDM modulation, level of QAM, and so on. Typically, a SC mode may operate in dual payload mode, that is to say that the MIMO space-time coding is arranged to provide extra data capacity in relation to the capacity that may be available using a single antenna. This may be beneficial since the SC mode may be used in particular in high signal to noise ratio, low dispersion situations when maximum throughput is require. An OFDM mode may typically operate in dual or single payload modes, according to the propagation conditions and the received signal quality. If the channel experiences significant multipath, it may be beneficial to select a modulation mode that uses MIMO space-time coding to increase the robustness of the link by using the multiple signal paths to provide diversity rather than extra data capacity. Hence, if it is determined to move from using a SC modulation mode to using an OFDM modulation mode in dependence on a difference between OFDM and SC channel equalisation characteristics, it may also be determined that a MIMO space-time coding scheme be selected according to, at least in part, the difference between OFDM and SC channel equalisation characteristics. So, it can be seen that an adaptive modulation system applied to the arrangement of FIG. 6 may use a measure of difference between an OFDM channel equalisation characteristic and a single carrier channel equalisation characteristic, in conjunction with a measure of signal quality such as vector error, to determine a selection of modulation mode, the modulation mode including a specified MIMO scheme.

In embodiments of the invention, determining a channel equalisation characteristic for a single carrier equaliser from a channel equalisation characteristic for an OFDM equaliser may be performed by calculation of single carrier equaliser coefficients using a linear least means squared estimator as follows. A set of frequencies within the OFDM equaliser characteristic is initially determined at which the estimation is to be optimised. There may be Nf frequencies and these frequencies are given by the vector FREQS. The frequencies are typically linearly space but this is not a requirement. A second vector H gives the desired frequency response for each frequency in FREQS, so the i'th element in H is the frequency response of the OFDM equaliser at the frequency corresponding to the i'th element in FREQS. The single carrier equaliser has Nt taps. A matrix HF is constructed that gives the frequency response for the taps of the single carrier equaliser. One dimension of the matrix has length equal to the number of taps and the other dimension has length equal to the number of frequencies Nf. Each element of HF refers to the frequency response of one of the Nt taps at one of the Nf frequencies. The calculation of each element of HF accounts for the delay for the tap at the frequency of interest. Associated with the single carrier equaliser is the coefficient array A of length Nt. Each element of A gives the coefficient by which the associated tap of the filter is multiplied. The equaliser output is the sum of the products from the coefficient multipliers.

The linear least squares estimator may calculate the coefficient array A given the target frequency response H and the single carrier frequency response matrix HF. The calculation may involve the following steps. Firstly, calculating the cross-covariance C matrix between H and HF:C=H×HF'. Then calculating the auto-covariance R matrix of HF:R=HF×HF', and then calculating the coefficient vector A:A=C/R. The first two calculations are matrix multiplications and the last is a matrix division. Much of the calculation can be pre-computed since HF is constant reducing the processing requirement of the implementation.

The frequency response of the single carrier equaliser with the coefficient array A may be obtained by multiplying A by HF'. A frequency response error vector E may be calculated as the difference between the single carrier equaliser response A*HF' and the desired response H and given by E=A*HF'−H. The normalised estimation error is given by En=(E*E')/(H*H'), that is to say En is the mean of the square of the response error divided by the mean of the desired response.

Figure 7:
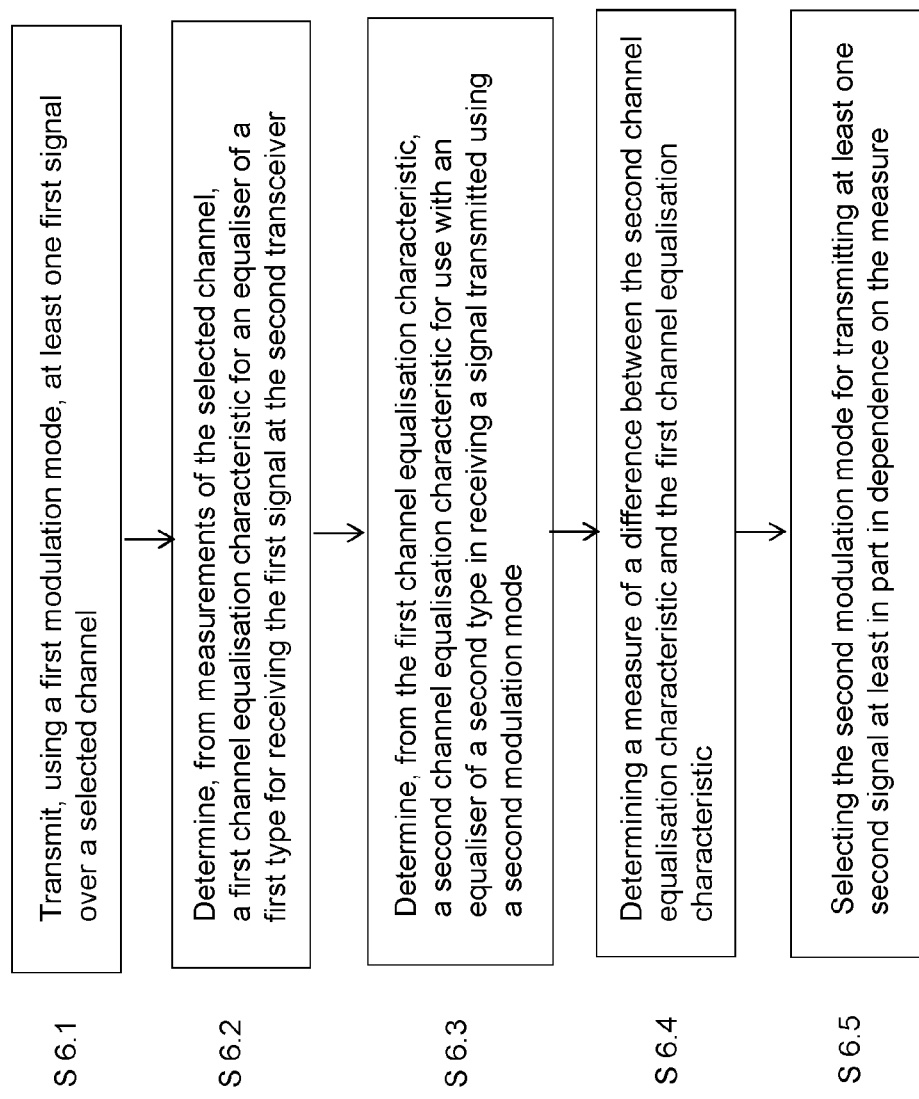
FIG. 7 is a flow diagram of a method according to an embodiment of the invention.

FIG. 7 is a flow diagram of a method according to an embodiment of the invention, including steps S6.1 to S6.5 as shown.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of adaptive modulation in a wireless communication system, the wireless communication system including first and second transceivers operable to transmit and receive signals over a communication channel using a plurality of modulation modes, comprising:
   receiving a first signal transmitted using a first modulation mode over the communication channel from the first transceiver to the second transceiver;
   determining, from measurements of the communication channel, a first channel equalisation characteristic for an equaliser of a first type for receiving the first signal at the second transceiver;
   determining, from the first channel equalisation characteristic, a second channel equalisation characteristic for an equaliser of a second type for a second modulation mode;
   determining a measure of a difference between the second channel equalisation characteristic and the first channel equalisation characteristic; and
   selecting the second modulation mode for transmission over the communication channel from the first transceiver at least in part in dependence on said measure.

2. The method of claim 1, wherein said measure comprises data representative of least mean squared error estimates of the difference between the second channel equalisation characteristic and the first channel equalisation characteristic.

3. The method of claim 1, wherein said measure is a normalised estimation error.

4. The method of claim 1, comprising:
   determining the second channel equalisation characteristic on the basis of a least squares error estimation process with respect to the first channel equalisation characteristic.

5. The method of claim 1, comprising:
   determining a measure of signal quality of the first signal as received at the second transceiver; and
   selecting the second modulation mode at least in part in dependence on the determination of signal quality in combination with said measure.

6. The method of claim 5, wherein said determination of signal quality comprises an estimate of an error between a received signal vector and an expected modulation state.

7. The method of claim 6, wherein said selecting is at least in part in dependence on a sum of an estimate of vector error, the estimate of vector error comprising an error between a received signal vector and an expected modulation state, and said measure of a difference between the second channel equalisation characteristic and the first channel equalisation characteristic.

8. The method of claim 7, wherein said selecting comprises comparing the sum with a predetermined threshold.

9. The method of claim 1, comprising:
   transmitting a second signal over the selected channel using the second modulation mode; and
   receiving the second signal at the second transceiver by a process comprising initialising the equaliser of the second type to apply the second channel equalisation characteristic.

10. The method of claim 1, wherein the first modulation mode is an Orthogonal Frequency Division Multiplexing (OFDM) mode and the second modulation mode is a single carrier mode.

11. The method of claim 1, wherein the second modulation mode is a single carrier Quadrature Amplitude Modulation (QAM) mode using pilot symbol assisted modulation.

12. The method of claim 1, wherein the equaliser of the first type is an Orthogonal Frequency Division Multiplexing (OFDM) equaliser, and the first channel equalisation characteristic is a frequency domain channel estimate.

13. The method of claim 1, wherein the equaliser of the second type is a tapped delay line equaliser, and the second channel equalisation characteristic is a frequency domain characteristic of the tapped delay line equaliser.

14. A transceiver for use in a wireless communication system, the wireless communications system including the transceiver and a further transceiver, the transceiver and the further transceiver being operable to transmit and receive signals over a communication channel using a plurality of modulation modes, the transceiver comprising:
   a receiver configured to receive, using a first modulation mode, a first signal transmitted over the communication channel from the further transceiver; and
   a processor configured to:
      determine, from measurements of the communication channel, a first channel equalisation characteristic for an equaliser of a first type for receiving the first signal;
      determine, from the first channel equalisation characteristic, a second channel equalisation characteristic for use with an equaliser of a second type in receiving a signal transmitted over the communication channel using a second modulation mode;
      determine a measure of a difference between the second channel equalisation characteristic and the first channel equalisation characteristic; and
      select the second modulation mode for transmitting at least one second signal from the further transceiver at least in part in dependence on said measure.

* * * * *